US012710899B2

(12) United States Patent
Lee et al.

(10) Patent No.: US 12,710,899 B2
(45) Date of Patent: Aug. 18, 2026

(54) SYSTEM FOR GENERATING VIRTUAL BLOCK STRIPES IN A MEMORY DEVICE

(71) Applicant: MICRON TECHNOLOGY, INC., Boise, ID (US)

(72) Inventors: Aaron Lee, Sunnyvale, CA (US); Daniel Zhang, Milpitas, CA (US); Yang Liu, Melissa, TX (US); Tingjun Xie, Milpitas, CA (US); Juane Li, Milpitas, CA (US); Jiangli Zhu, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 18/820,085

(22) Filed: Aug. 29, 2024

(65) Prior Publication Data

US 2026/0064322 A1 Mar. 5, 2026

(51) Int. Cl.
*G06F 3/06* (2006.01)

(52) U.S. Cl.
CPC .......... *G06F 3/0665* (2013.01); *G06F 3/0619* (2013.01); *G06F 3/064* (2013.01); *G06F 3/0679* (2013.01)

(58) Field of Classification Search
CPC ...... G06F 3/0665; G06F 3/0619; G06F 3/064; G06F 3/0679
See application file for complete search history.

(56) References Cited

U.S. PATENT DOCUMENTS

| | | | | |
|---|---|---|---|---|
| 10,606,693 | B2 | 3/2020 | Hornung et al. | |
| 2009/0240873 | A1* | 9/2009 | Yu | G06F 3/0608 711/E12.001 |
| 2010/0306580 | A1* | 12/2010 | McKean | G06F 12/0246 711/E12.001 |
| 2016/0224244 | A1* | 8/2016 | Gensler, Jr. | G06F 3/0631 |
| 2019/0332331 | A1* | 10/2019 | Hsieh | G06F 3/0617 |
| 2019/0378591 | A1* | 12/2019 | Kanno | G11C 29/76 |
| 2021/0132835 | A1* | 5/2021 | Shabi | G06F 3/0641 |
| 2023/0069159 | A1* | 3/2023 | Huang | G06F 11/3037 |
| 2024/0319893 | A1* | 9/2024 | Niemeyer | G06F 3/0653 |
| 2024/0419367 | A1* | 12/2024 | Yu | G06F 3/0664 |

* cited by examiner

*Primary Examiner* — Nanci N Wong
(74) *Attorney, Agent, or Firm* — Tarolli, Sundheim, Covell & Tummino LLP

(57) ABSTRACT

A method for generating a virtual block stripe in a memory device is described. The method includes determining a minimum quantity of data blocks in the virtual block stripe to be generated and determining that a first bank has a first quantity of operational data blocks that is greater than the minimum quantity of data blocks in the virtual block stripe. The method also includes determining that a second bank has a second quantity of operational data blocks that is less than the minimum quantity of data blocks in the virtual block stripe and logically mapping one or more data blocks of the first bank to the second bank. The method further includes generating the virtual block stripe comprising the second quantity of operational data blocks of the second bank and the logically mapped one or more data blocks of the first bank.

16 Claims, 11 Drawing Sheets

SYSTEM FOR GENERATING VIRTUAL BLOCK STRIPES IN A MEMORY DEVICE

TECHNICAL FIELD

This disclosure relates to memory devices, and particularly to a system for generating virtual block stripes in a memory device.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells. However, in response to multiple accesses of memory cells (reading data from and/or writing data to the memory cells), the quality of the memory cells for accurately storing data (e.g., without bit errors) can be degraded.

DETAILED DESCRIPTION

Figure 1A:
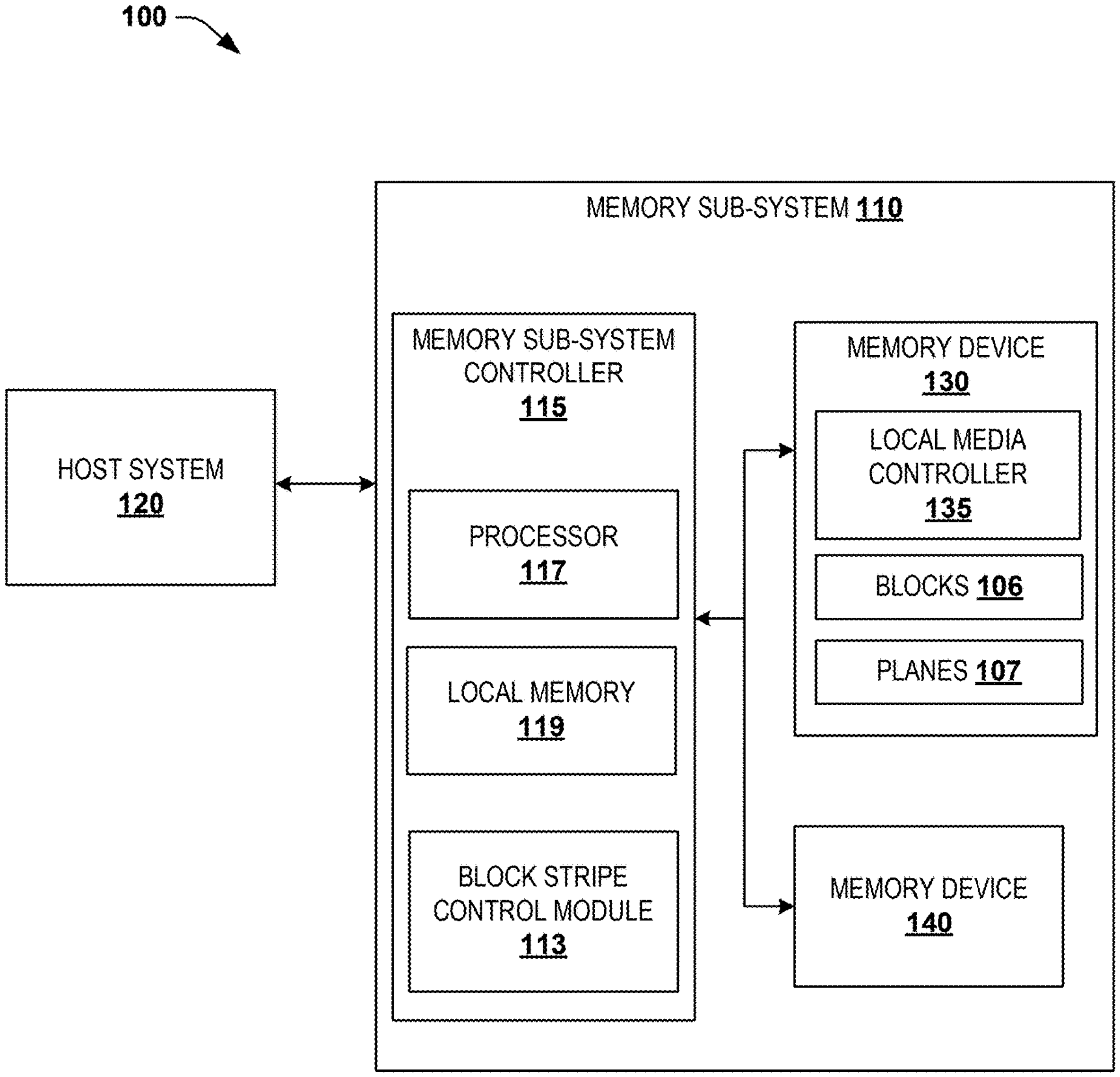
FIG. 1A illustrates system for decoding data from a memory sub-system.

This disclosure relates to memory devices, and particularly to a system for generating virtual block stripes in a memory device. As described herein, a memory device that includes a plurality of banks can be reorganized to include a plurality of virtual block stripes to provide enhanced operational consistency, such as to implement a redundant array of independent nodes (RAIN). As described herein, the term "bank" refers to a set of data blocks that are physically arranged in a row across a set of planes of the memory device, and are thus physically connected across a full width of the memory device (e.g., across all of the planes of the memory device). As described herein, the term "virtual block stripe" refers to a set of data blocks that are logically mapped to provide a block stripe function, and can be physically disjointed across the set of planes of the memory device.

While it is ideal to implement memory stripe functions across each of the banks of data blocks of the memory device, many of the blocks of the memory device can be non-operational after fabrication of the memory device. Banks having different quantities of operational blocks can affect consistency of operation of the memory device. Additionally, banks that have too great a quantity of non-operational blocks (and thus too few a quantity of operational blocks) can be beyond proper operational specification (e.g., with respect to consistency of operation). Such a bank can thus be disabled despite having some operational blocks, thus providing inefficient memory capacity and suboptimal operational characteristics of the memory device.

To provide a greater quantity of block stripes, and thus a greater efficiency of the associated memory device, virtual block stripes can be generated by logically mapping data blocks across one or more of the banks. To generate virtual block stripes of the memory device, a controller can determine a minimum quantity of data blocks for the virtual block stripes, such as based on the total quantity of operational data blocks in the memory device relative to the quantity of non-operational data blocks in the memory device (e.g., based on which of the planes has the greatest quantity of operational data blocks). The controller can thus determine if a given bank has a quantity of operational blocks that is less than or greater than the minimum quantity of blocks of the virtual block stripes.

Based on the determination, the controller can donate excessive operational data blocks over the minimum quantity of data blocks from one bank to another bank having fewer than the minimum quantity of operational data blocks. The virtual block stripes can be logically mapped based on known donations of the data blocks through a virtual block stripe lookup table. Thus, the controller can generate a set of virtual block stripes that have an approximately equal quantity of data blocks and that maximizes the number of operational data blocks of the memory device to provide for greater capacity efficiency and greater consistency of operation.

A memory sub-system refers to a storage device, a memory module or some combination thereof. The memory sub-system includes a memory device or multiple memory devices that store data. The memory devices could be volatile or non-volatile memory devices. Some examples of a memory sub-system include high density non-volatile memory devices where retention of data is desired during intervals of time where no power is supplied to the memory device. One example of a non-volatile memory device is a not-AND (NAND) memory device. A non-volatile memory device is a package that includes a die(s). Each such die can include planes. For some types of non-volatile memory devices (e.g., NAND memory devices), each plane includes a set of physical blocks, and each physical block includes a set of pages. Each page includes a set of memory cells, which are commonly referred to as cells. A cell is an electronic circuit that stores information. A cell stores one or more bits of binary information and has various logic states that correlate to the number of bits being stored. The logic states are be represented by binary values, such as '0' and '1', or as combinations of such values, such as '00', '01', '10' and '11'.

A memory device includes multiple cells arranged in a two-dimensional or a three-dimensional array. In some examples, memory cells are formed on a silicon wafer in an array of columns connected by conductive lines (also referred to as bitlines, or BLs) and rows connected by conductive lines (also referred to as wordlines or WLs). A wordline is a row of associated memory cells in a memory device that are used with a bitline or multiple bitlines to generate the address of each of the memory cells. The intersection of a bitline and a wordline defines an address of a given memory cell.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A bank can thus correspond to a set of data blocks that are physically arranged in a linear mapping across multiple planes. A solid-state drive (SSD) is an example of a memory sub-system that includes a non-volatile memory device(s) and a memory sub-system controller to manage the non-volatile memory devices.

When data is stored in memory, certain algorithms can detect and correct a number of errors in the stored data. Error correction code (ECC) encodes data in such a way that errors in the data can be identified and corrected when the data is decoded. For example, data strings can be encoded by an ECC encoder by adding a number of redundant and/or parity bits to create corresponding codewords. When an original data string is to be retrieved from the memory, an ECC decoder can use the corresponding codewords to identify bit errors in the encoded data string. If bit errors are present, one or more ECC operations can be employed to correct the bit errors and to recover the original data string. In addition to outputting error-checked and/or error-corrected data, some implementations of the ECC can also generate metadata regarding an ECC decode operation.

As one example, to efficiently store data (e.g., ECC data and/or user data), the memory sub-system controller can be configured to designate or "stripe" groups of data blocks across the banks of the memory device, with each bank corresponding to a physical linear row of data blocks across a set of planes of the memory device. For example, a bank that is provided across the memory device can represent a complete set of data and can be implemented for a variety of reasons (e.g., RAIN). As one example, to avoid a single bank becoming a hotspot (e.g., subject to significantly more operations than other banks), the data blocks can be striped. As another example, block striping can be implemented based on identifying failed blocks in a given bank of data blocks, thus resulting in an inability to provide a data set across a given bank of data blocks.

One example of block striping provides that a given bank has only a single block of a data group. In this example, data blocks can be separated across banks in the memory device based on an offset (e.g., a single row per data block, two rows per data block, etc.). To provide offset row block striping, a controller can implement a striping optimization algorithm to determine a striping method that provides a most efficient striping or greatest number of block stripes. However, offset row block striping can still provide for inefficiencies in allocating data blocks to block stripes based on the geometric arrangement of the banks of data blocks. For example, while offset row block striping can overcome inefficiencies resulting from non-operational data blocks, large portions of data blocks at the top and bottom of a stack of data block banks can be unusable in such a block striping method. Accordingly, offset row block striping can still be inefficient for organizing data blocks into block stripes.

As described herein, to provide a greater efficiency in block striping than offset row block striping, the controller can generate virtual block stripes by logically mapping data blocks across one or more of the banks. As an example, the controller can determine a minimum quantity of data blocks for the virtual block stripes, such as based on the total quantity of operational data blocks in the memory device relative to the quantity of non-operational data blocks in the memory device, such as based on which of the planes has the greatest quantity of operational data blocks. The controller can thus determine if a given bank has a quantity of operational blocks that is less than or greater than the minimum quantity of blocks of the virtual block stripes.

Based on the determination, the controller can donate excessive operational data blocks over the minimum quantity of data blocks from one bank to another bank having fewer than the minimum quantity of operational data blocks. The virtual block stripes can be logically mapped based on known donations of the data blocks through a virtual block stripe lookup table. Thus, the controller can generate a set of virtual block stripes that have an approximately equal quantity of data blocks. In this manner, the data blocks of the memory device can be approximately evenly distributed between the virtual block stripes to ensure that every operational data block can be implemented in the block striping operation, as opposed to offset row block striping. Accordingly, the controller can maximize the number of operational data blocks of the memory device to provide for greater capacity efficiency and greater consistency of operation.

FIG. 1A illustrates a system 100 that includes a memory sub-system 110 that can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a mapping between components, which can be an indirect communicative mapping or direct communicative mapping (e.g., without intervening components), whether wired or wireless, including mappings such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication mapping, multiple separate communication mappings and/or a combination of communication mappings.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) or higher, can store multiple bits per cell. In some examples, each of the memory device(s) 130 can include one or more arrays of memory cells such as SLCs, MLCs, TLCs, QLCs, PLCs, or some combination thereof. In some examples, a particular memory device can include an SLC portion, an MLC portion, a TLC portion, QLC portion, and/or a PLC portion of memory cells. The memory cells of the memory device(s) 130 can be grouped as pages that can refer to a logical unit of the memory device used to store data. In some types of memory (e.g., NAND), pages can be grouped to form blocks 106. The blocks 106 can include sub-blocks, and can be organized across a set of planes 107 of the memory device 130 as banks of data blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), etc.

A memory sub-system controller 115 communicates with the memory device(s) 130 to perform operations such as reading data, writing data or erasing data at the memory device(s) 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or another suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory device(s) 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some examples, the memory device(s) 130 include local media controllers 135 that operate in concert with the memory sub-system controller 115 to execute operations on one or more memory cells of the memory device(s) 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these request for reading and/or write data by interacting with the memory sub-system 110, managing the flow of data to and from the memory device 130 and/or the memory device 140 within the memory sub-system 110. This reading and writing of data enables operation of computing systems where data access and management is needed.

In various examples, the memory sub-system 110 includes a block stripe control module 113 that can implement a virtual block assignment algorithm to organize the data blocks of the memory device 130 into virtual block stripes. In some examples, the memory sub-system controller 115 includes at least a portion of the block stripe control module 113. In some examples, the block stripe control module 113 is part of the host system 120, an application or an operating system. In other examples, local media controller 135 includes a portion of the block stripe control module 113 and is configured to perform the functionality described herein.

As described herein, the block stripe control module 113 can generate virtual block stripes by logically mapping data blocks 106 of the memory device 130 across one or more of the banks. As an example, the block stripe control module 113 can determine a minimum quantity of data blocks 106 for the virtual block stripes, such as based on the total quantity of operational data blocks 106 in the memory device relative to the quantity of non-operational data blocks 106 in the memory device, such as based on which of the planes has the greatest quantity of operational data blocks 106. The block stripe control module 113 can thus determine if a given bank has a quantity of operational blocks 106 that is less than or greater than the minimum quantity of blocks 106 of the virtual block stripes.

Based on the determination, the block stripe control module 113 can donate excessive operational data blocks 106 over the minimum quantity of data blocks 106 from one bank to another bank that has fewer than the minimum quantity of operational data blocks 106. The virtual block stripes can be logically mapped based on known donations of the data blocks 106 through a virtual block stripe lookup table. Thus, the block stripe control module 113 can generate a set of virtual block stripes that have an approximately equal quantity of data blocks 106 corresponding to the minimum quantity of data blocks 106, with some virtual block stripes potentially having one additional data block corresponding to a remainder. In this manner, the data blocks 106 of the memory device can be approximately evenly distributed between the virtual block stripes to ensure that every operational data block can be implemented in the block striping operation, as opposed to offset row block striping. Accordingly, the block stripe control module 113 can maximize the number of operational data blocks 106 of the memory device to provide for greater capacity efficiency and greater consistency of operation.

Figure 1B:
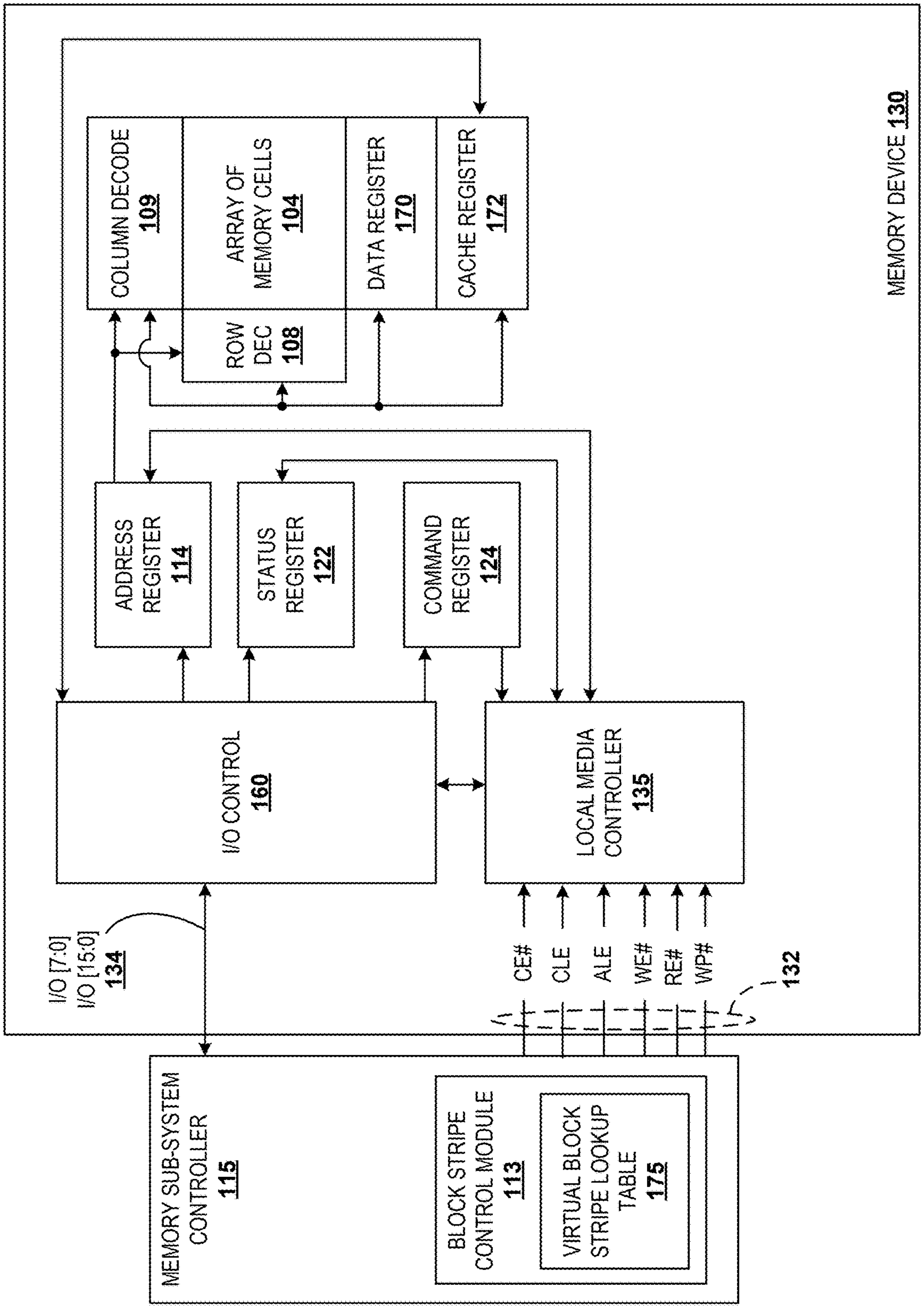
FIG. 1B illustrates a simplified block diagram of an example memory device in communication with a memory sub-system controller.

FIG. 1B illustrates a simplified block diagram of an example of a first apparatus, in the form of a memory device 130, in communication with an example of a second apparatus, in the form of a memory sub-system controller 115 of a memory sub-system (e.g., the memory sub-system 110 of FIG. 1A). Some examples of electronic systems include personal computers, personal digital assistants (PDAs), digital cameras, digital media players, digital recorders, games, appliances, vehicles, wireless devices, mobile telephones, etc. The memory sub-system controller 115 (e.g., a controller external to the memory device 130), can be a memory controller or other external host device.

The memory device 130 includes an array of memory cells 104 logically arranged in rows and columns. As an example, the memory cells 104 can be arranged in an assortment of multiple blocks 106, with each block including a set of sub-blocks. The blocks/sub-blocks are grouped together to form the planes 107 of the memory device 130. The memory cells 104 form a non-transitory computer-readable medium. Memory cells of a logical row are connected to the same access line (e.g., a wordline) while memory cells of a logical column are selectively connected to the same data line (e.g., a bit line) in some examples. In some examples, a single access line is associated with more than one logical row of memory cells and a single data line may be associated with more than one logical column. Memory cells of at least a portion of the array of memory cells 104 are capable of being programmed to one of at least two target data states.

The memory device 130 includes row decode circuitry 108 and column decode circuitry 109 for decoding address signals. Address signals are received and decoded to access an array of memory cells 104 of the memory device 130. The memory device 130 also includes input/output (I/O) control circuitry 160 to manage input of commands, addresses and data to the memory device 130 as well as output of data and status information from the memory device 130. The memory device 130 has an address register 114 and is in communication with the I/O control circuitry 160, the row decode circuitry 108 and the column decode circuitry 109 to latch the address signals prior to decoding. The memory device 130 also includes a command register 124 in communication with the I/O control circuitry 160 and a local media controller 135 to latch incoming commands.

A controller (e.g., the local media controller 135 internal to the memory device 130) controls access to the array of memory cells 104 in response to the commands and generates status information for the external memory sub-system controller 115. For example, the local media controller 135 is configured to perform access operations (e.g., read operations, programming operations and/or erase operations) on the array of memory cells 104. The local media controller 135 is in communication with the row decode circuitry 108 and the column decode circuitry 109 to control the row decode circuitry 108 and the column decode circuitry 109 in response to the addresses.

As described above in the example of FIG. 1A, the block stripe control module 113 can implement a virtual block assignment algorithm to organize the data blocks 106 of the memory device 130 into virtual block stripes. As described herein, the virtual block assignment algorithm can provide for donating and logically mapping data blocks 106 from banks that have a higher quantity of data blocks 106 to banks that have a lower quantity of data blocks 106. The logical mapping of the data blocks 106 in each of the virtual block stripes can be stored in a virtual block stripe lookup table 175. Therefore, the generated virtual block stripes can maximize data storage and can exhibit operational consistency of the memory device 130.

The local media controller 135 is also in communication with a cache register 172. The cache register 172 latches data, either incoming or outgoing, as directed by the local media controller 135 to temporarily store data while the array of memory cells 104 is busy writing or reading, respectively, other data. During a programming operation (e.g., write operation), data is passable from the cache register 172 to the data register 170 for transfer to the array of memory cells 104, and new data can be latched in the cache register 172 from the I/O control circuitry 160. During a read operation, data is passable from the cache register 172 to the I/O control circuitry 160 for output to the memory sub-system controller 115. New data is passable from the data register 170 to the cache register 172. The cache register 172 and/or the data register 170 form (e.g., or form a portion of) a page buffer of the memory device 130. The page buffer includes sensing devices (not shown in FIG. 1B) to sense a data state of a memory cell of the array of memory cells 104. For example, the sensing devices sense a state of a data line connected to that memory cell. The memory device 130 also includes a status register 122 in communication with the I/O control circuitry 160 and the local media controller 135 to latch the status information for output to the memory sub-system controller 115.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE # and/or a write protect signal WP #. Additional or alternative control signals (not shown) can be further received over control link 132 depending upon the nature of the memory device 130. In some examples, the memory device 130 receives command signals (which represent commands), address signals (which represent addresses) and data signals (which represent data) from the memory sub-system controller 115 over a multiplexed input/output (I/O) bus 134 and outputs data to the memory sub-system controller 115 over the I/O bus 134.

In some examples, the commands are received over input/output (I/O) pins [7:0] of the I/O bus 134 at I/O control circuitry 160 and may then be written into the command register 124. The addresses are received over input/output (I/O) pins [7:0] of the I/O bus 134 at I/O control circuitry 160 and written into the address register 114. The data is receivable over input/output (I/O) pins [7:0] for an 8-bit device or input/output (I/O) pins [15:0] for a 16-bit device at I/O control circuitry 160 and is writable into the cache register 172. The data is subsequently written into the data register 170 for programming the array of memory cells 104 in some examples.

In some examples, the cache register 172 is omitted, and in such examples, the data is written directly into the data register 170. Additionally, or alternatively, data is output over input/output (I/O) pins [7:0] for an 8-bit device or input/output (I/O) pins [15:0] for a 16-bit device. Moreover, it is noted that although reference is made to I/O pins, in other examples, a different conductive node providing for electrical mapping to the memory device 130 by an external device (e.g., the memory sub-system controller 115), such as conductive pads or conductive bumps could be used in addition to or as a replacement for the I/O pins.

The example memory device 130 of FIG. 1B has been simplified. Moreover, in other examples, the functionality of the various block components described with reference to FIG. 1B are not segregated to distinct components or component portions of an integrated circuit device. For example, a single component or component portion of an integrated circuit device could be adapted to perform the functionality of more than one block component of FIG. 1B. Alternatively, components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) are useable in various examples.

Figure 2A:
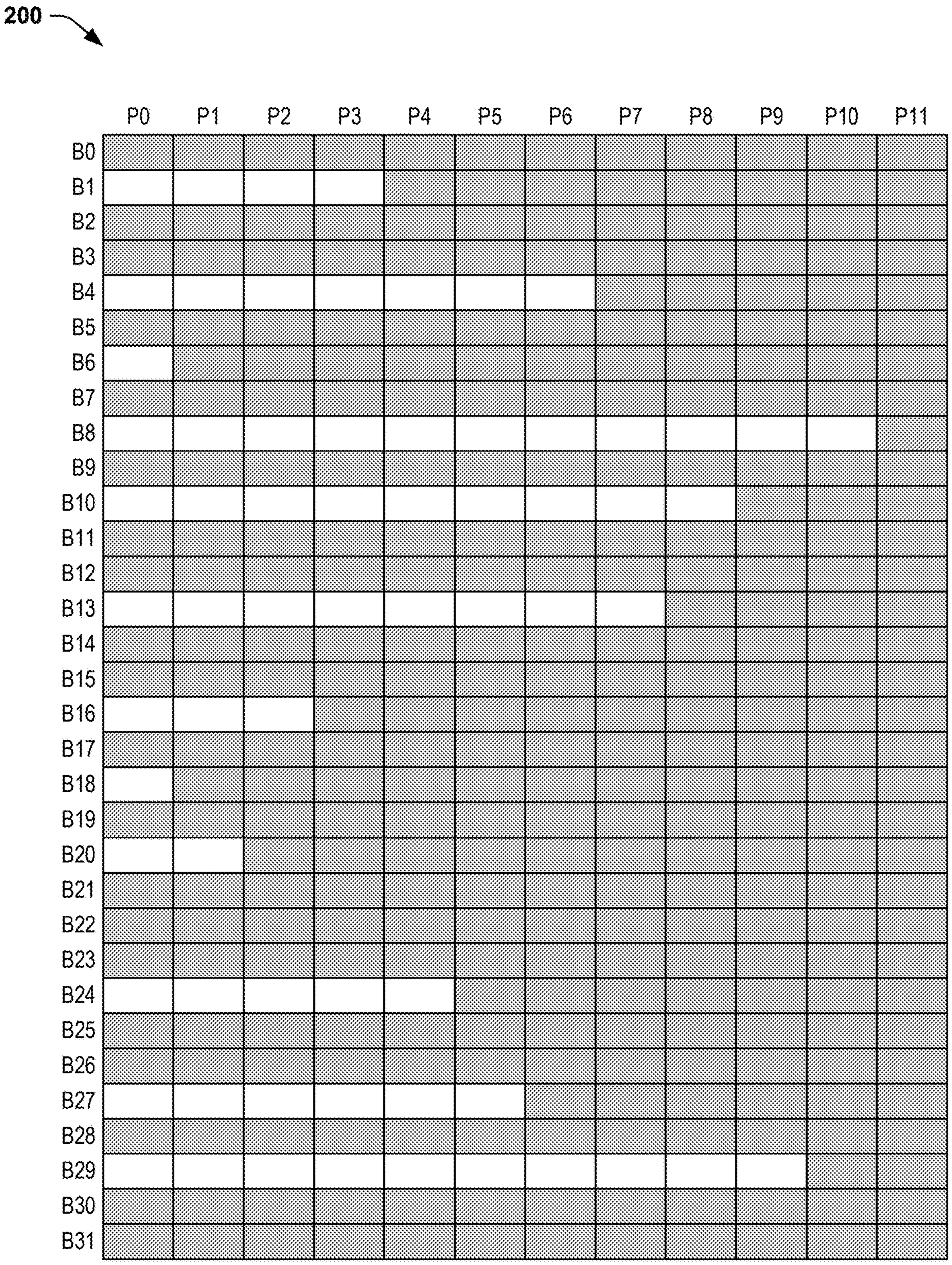
FIG. 2A illustrates an example diagram of a memory device.
Figure 2B:
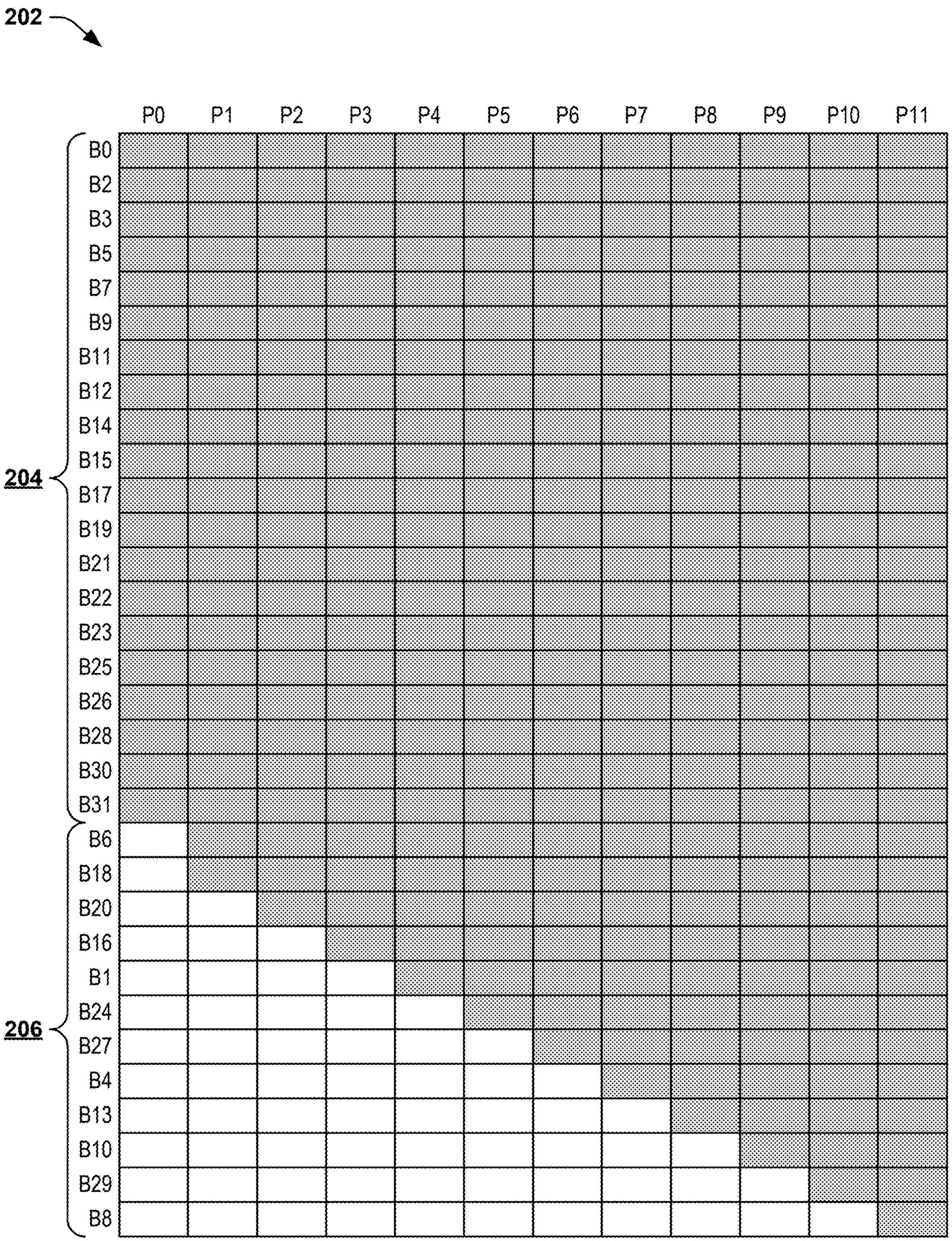
FIG. 2B illustrates another example diagram of the memory device.

FIGS. 2A and 2B illustrate an example diagram 200 and 202, respectively, of the memory device 130. The diagrams 200 and 202 each demonstrate data blocks 106 in the memory device 130 that are organized as banks B0 through B31 across a set of planes P0 through P11. The memory device 130 is demonstrated by example, in that the memory device 130 could include more or fewer banks and/or planes than demonstrated in the example of FIGS. 2A and 2B.

As described herein, after fabrication of the memory device 130, some of the data blocks 106 therein can be non-operational. In the examples of FIGS. 2A and 2B, the data blocks 106 are demonstrated as shaded blocks that correspond to operational data blocks 106, and as non-shaded blocks that correspond to non-operational blocks 106. The example of FIGS. 2A and 2B demonstrate that all groups of the non-operational blocks 106 in each respective one of the banks that include non-operational blocks 106 are demonstrated as extending from the first plane P0 by example for ease in description herein. In reality, the non-operational blocks 106 can be distributed about the banks and planes in a non-contiguous manner.

In the example of FIG. 2A, the bank B1 includes four non-operational blocks across P0 through P3, the bank B4 includes seven non-operational blocks across P0 through P6, and the bank B6 includes one non-operational block at P0. Similarly, the bank B8 includes eleven non-operational blocks across P0 through P10, the bank B10 includes nine non-operational blocks across P0 through P8, and the bank B13 includes eight non-operational blocks across P0 through P7. Similarly, the bank B16 includes three non-operational blocks across P0 through P2, the bank B18 includes one non-operational block at P0, and the bank B20 includes two non-operational blocks at P0 and P1, respectively. Similarly, the bank B24 includes five non-operational blocks across P0 through P4, the bank B27 includes six non-operational blocks across P0 through P5, and the bank B29 includes ten non-operational blocks across P0 through P9. As an example, the location of the non-operational blocks can be arbitrary, and can be determined through post-fabrication testing of the memory device 130.

In the example of FIG. 2B, the banks B0 through B31 are demonstrated as reorganized for ease of description, such that the physical locations of the banks B0 through B31 do not change. The banks B0 through B31 are reorganized to provide all of the banks having an entire set of operational data blocks at 204 and all of the banks having at least one non-operational block at 206. The banks 206 are organized from top to bottom by quantity of non-operational blocks for ease of description. In practice, the memory device 130 is physically unchanged, and the block stripe control module 113 can implement the virtual block stripe algorithm on the banks in the static pre-set physical locations (e.g., as demonstrated in the example of FIG. 2B) to generate the virtual block stripes. The implementation of the virtual block stripe algorithm by the block stripe control module 113 is demonstrated in greater detail in the examples of FIGS. 3A through 3D. In the examples of FIGS. 3A through 3D, specific data blocks will be denoted by a coordinate system of (Bx, Py), where x and y are indices of bank and plane, respectively.

Figure 3A:
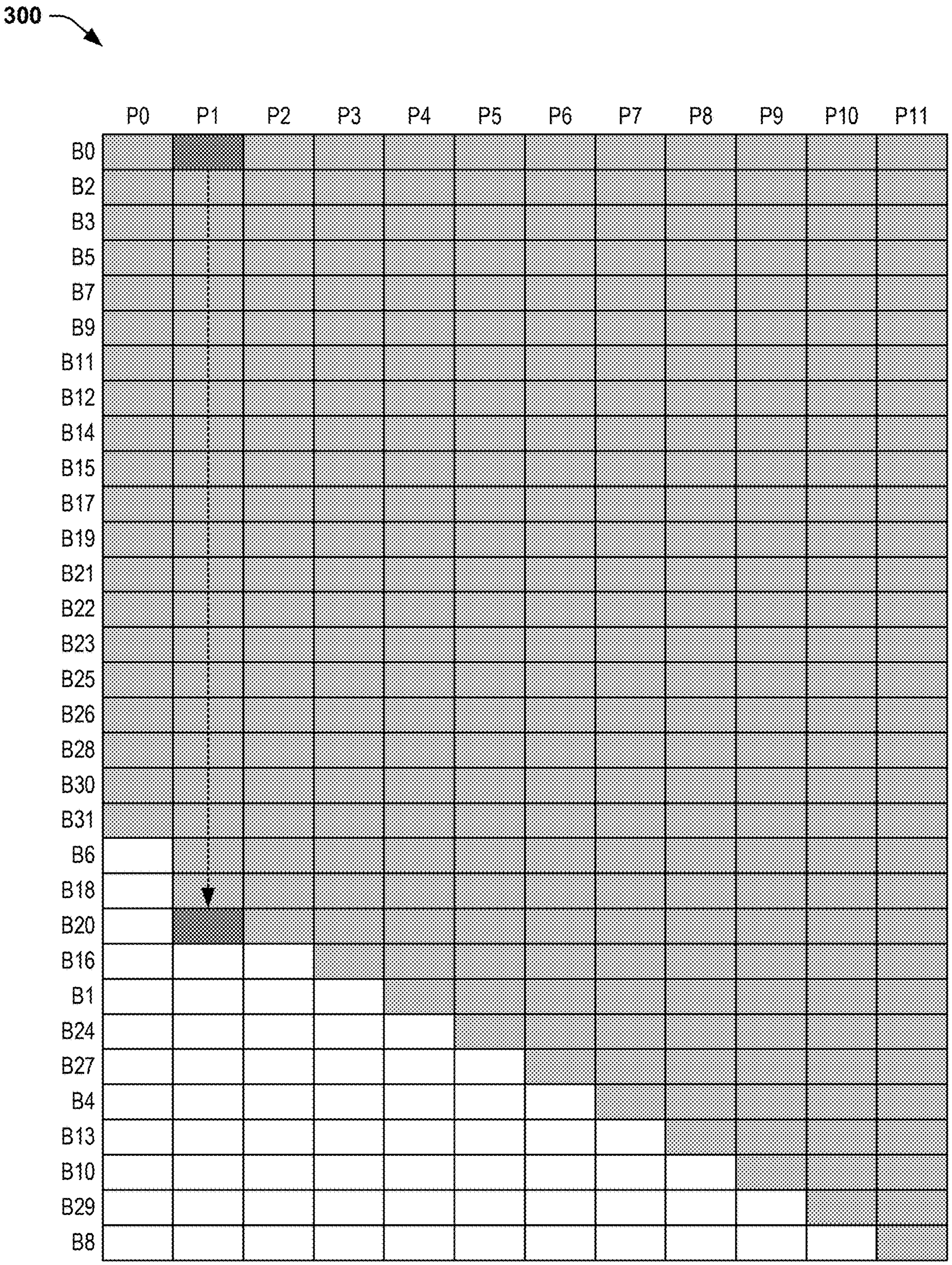
FIG. 3A illustrates an example diagram of generating virtual block stripes.

FIG. 3A illustrates an example diagram 300 of generating virtual block stripes in the memory device 130. The diagram 300 demonstrates a manner in which the block stripe control module 113 can donate operational data blocks from banks having operational data blocks to banks that have at least one non-operational data block. As described herein, the term "donate" refers to the process of logically disassociating a data block from a bank in which it is included and logically mapping that data block to another bank that includes at least one non-operational data block. The logical mapping allows the donated operational data block to thus form a virtual block stripe with other operational data blocks in a different physical bank to collectively store a data set in the different physically located banks of data blocks.

In the virtual block stripe algorithm, the block stripe control module 113 can determine the total quantity of operational data blocks in the memory device 130 relative to the quantity of non-operational data blocks. As an example, the block stripe control module 113 can determine an average quantity of operational data blocks that can occupy each of the virtual block stripes to determine which of the banks can donate data blocks and which of the banks can receive donated data blocks. For example, the block stripe control module 113 can determine the greatest quantity of operational blocks in a given one of the planes P0 through P11, and can divide the total quantity of operational data blocks by the greatest quantity of operational blocks in a given one of the planes P0 through P11 to determine a minimum quantity of operational blocks in the virtual block stripes. The quotient of the division can be a decimal number, thus providing a maximum quantity of operational blocks in the virtual block stripes to be one greater than the minimum to accommodate a remainder after donating all operational data blocks to generate all of the virtual block stripes.

The block stripe control module 113 can thus determine which of the banks has a quantity of operational blocks that is greater than the minimum quantity of data blocks in the virtual block stripes, and can donate operational data blocks from the respective bank. The block stripe control module 113 can also determine which of the banks has a quantity of operational blocks that is less than the minimum quantity of data blocks in the virtual block stripes, and can logically map donated operational data blocks to the respective bank to form a respective virtual block stripe.

In the example of FIG. 3A, as an example, the block stripe control module 113 can determine that the minimum quantity of operational data blocks in the virtual block stripes is eleven. Because the quotient can be a decimal, the maximum quantity of operational blocks in the virtual block stripes is twelve. Therefore, the block stripe control module 113 can step through each of the banks that includes non-operational data blocks to determine if the respective bank has a quantity of operational data blocks that is less than ten. If the respective bank does have a quantity of operational data blocks that is less than ten, the block stripe control module 113 can determine that the respective bank requires one or more donor data blocks. Additionally, the block stripe control module 113 can determine that banks that include eleven operational data blocks can be ignored by the virtual block stripe algorithm, and can determine that banks that include the full twelve operational data blocks can donate a data block to one of the banks having operational data blocks numbering less than eleven.

As an example, the block stripe control module 113 can maintain a queue that includes information as to which banks require donor blocks and/or which banks can donate blocks. Accordingly, the block stripe control module 113 can access the queue to reconcile the donated blocks and the donor block requests. The block stripe control module 113 can thus logically map the donated blocks to the respective banks to form the virtual block stripes. The logical mapping can be stored in a virtual block stripe lookup table to allow donated blocks in disparate physical locations to operate with blocks in different bank(s) to form the common data set of the virtual block stripe.

In the example of FIG. 3A, the block stripe control module 113 can determine that banks B6 and B18 include one non-operational data block, and thus eleven operational data blocks. The block stripe control module 113 can thus ignore banks B6 and B18 because the quantity of operational data blocks in banks B6 and B18 is equal to the minimum. The block stripe control module 113 can thus generate a virtual block stripe for each of the banks B6 and B18 that correspond respectively to the data blocks in the respective banks B6 and B20.

However, the block stripe control module 113 can determine that bank B20 has only ten operational data blocks. Therefore, the bank B20 can receive a donor block from a bank that includes twelve operational data blocks. In the example of FIG. 3A, the block stripe control module 113 selects a donor block from the bank B0, particularly block (B0, P1), and logically maps the donor block to the bank B20. The selected donor block from the bank B0 is demonstrated as the block at plane P1 for ease of description, but could be any of the operational data blocks (B0, P0-P11). The data block that is donated from the bank B0 to the bank B20 is demonstrated as having a darker shading. Therefore, the block stripe control module 113 can generate a virtual block stripe with the logical mapping of the data block (B0, P1) and the data blocks (B20, P2-P11). Additionally, because the donation of the data block (B0, P1) provides that the quantity of the operational data blocks in the bank B0 is now eleven based on the disassociation of the data block (B0, P1) from the bank B0, the block stripe control module 113 can generate a virtual block stripe corresponding to the remaining operational data blocks (B0, P0) and blocks (B0, P2-P11).

Figure 3B:
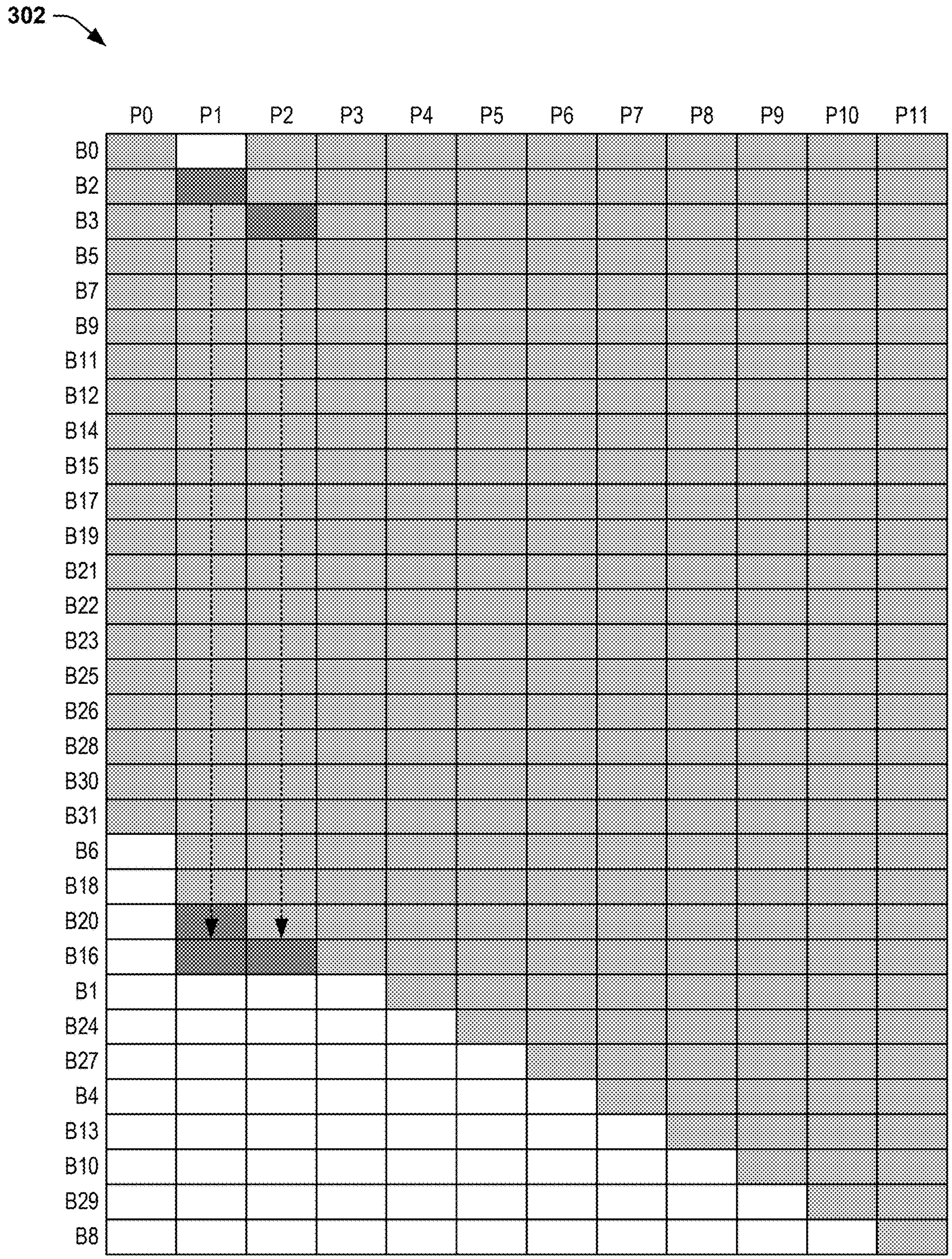
FIG. 3B illustrates another example diagram of generating virtual block stripes.

In an example diagram 302 in the example of FIG. 3B, the dissociation of the data block (B0, P1) from the bank B0 is demonstrated as being non-shaded to demonstrate that the respective data block (B0, P1) is not included the virtual data stripe that includes the remaining operational data blocks of bank B0. In addition, in the example of FIG. 3B, the block stripe control module 113 can determine that bank B16 has only nine operational data blocks. Therefore, the bank B16 can receive donor blocks from separate banks that include twelve operational data blocks. In the example of FIG. 3B, the block stripe control module 113 selects a first donor block from the bank B2, particularly block (B2, P1), and a second donor block from the bank B3, particularly block (B3, P2), and logically maps the donor blocks to the bank B16. The selected donor blocks from the banks B2 and B3 are demonstrated as the blocks at planes P1 and P2, respectively for ease of description, but could be any of the operational data blocks in the respective banks B2 and B3. The data blocks that are donated from the banks B2 and B3 to the bank B16 are demonstrated as having a darker shading. Therefore, the block stripe control module 113 can generate a virtual block stripe with the logical mapping of the data blocks (B2, P1) and (B3, P2) and the data blocks (B16, P3-P11).

Additionally, because the donation of the data blocks (B2, P1) and (B3, P2) provide that the quantity of the operational data blocks in the respective banks B2 and B3 is now eleven based on the disassociation of the respective data blocks (B2, P1) and (B3, P2) from the banks B2 and B3, the block stripe control module 113 can generate virtual block stripes corresponding to the remaining operational data blocks (B2, P0) and blocks (B2, P2-P11) in bank B2, and the remaining operational data blocks (B3, P0), (B3, P1) and blocks (B3, P3-P11) in bank B3. In the example of FIG. 3B, the selection of the two data blocks for donation to the bank B16 are thus from two separate banks of fully operational data blocks to provide two additional virtual block stripes of quantity eleven, and thus equal to the minimum quantity of data blocks of the virtual block stripes. In other words, in this example, the block stripe control module 113 cannot donate two data blocks from one bank because the disassociation of the data blocks from the respective bank would result in the quantity of data blocks of the respective bank being ten, and thus less than the minimum quantity.

Figure 3C:
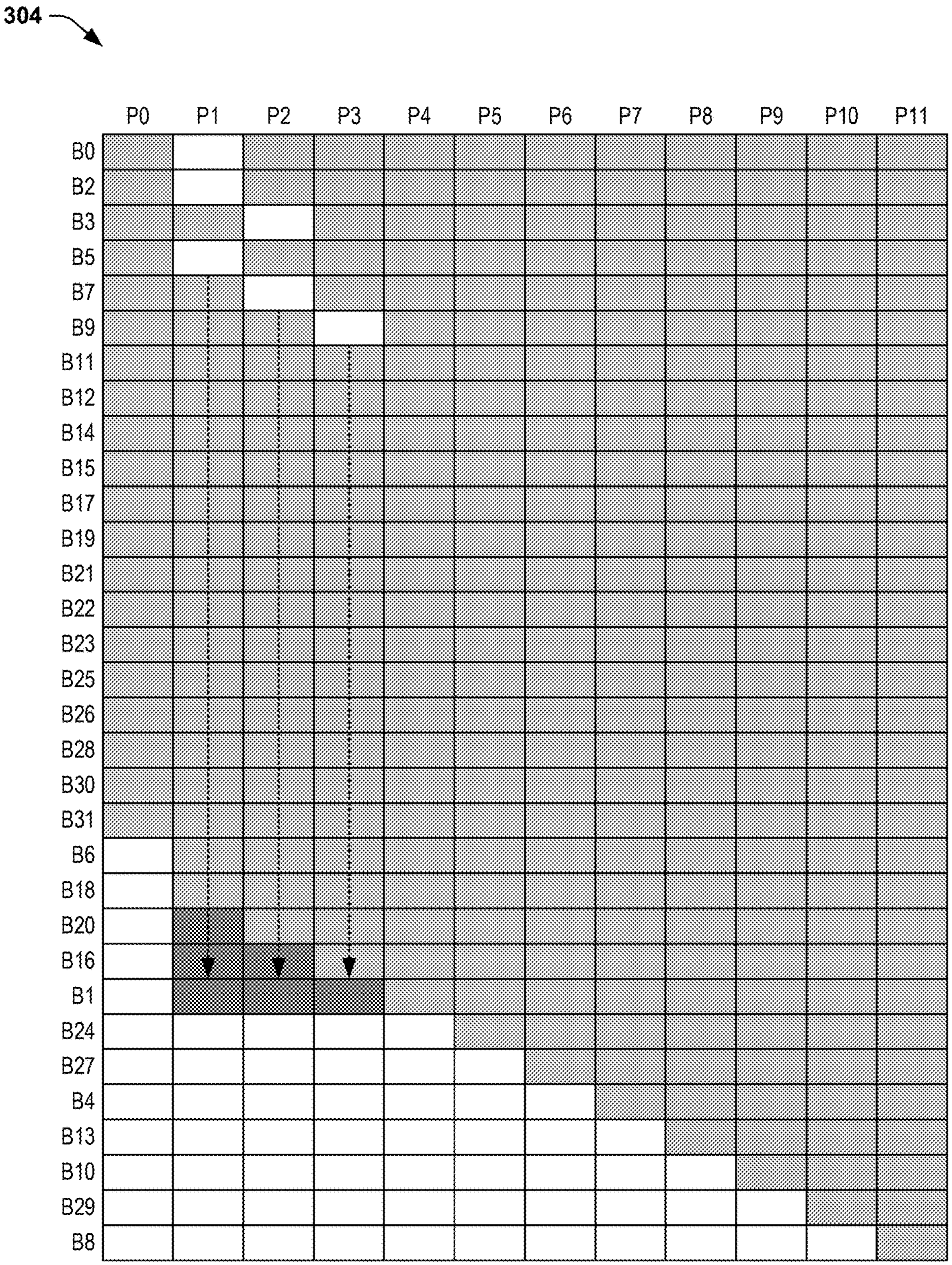
FIG. 3C illustrates another example diagram of generating virtual block stripes.
Figure 3D:
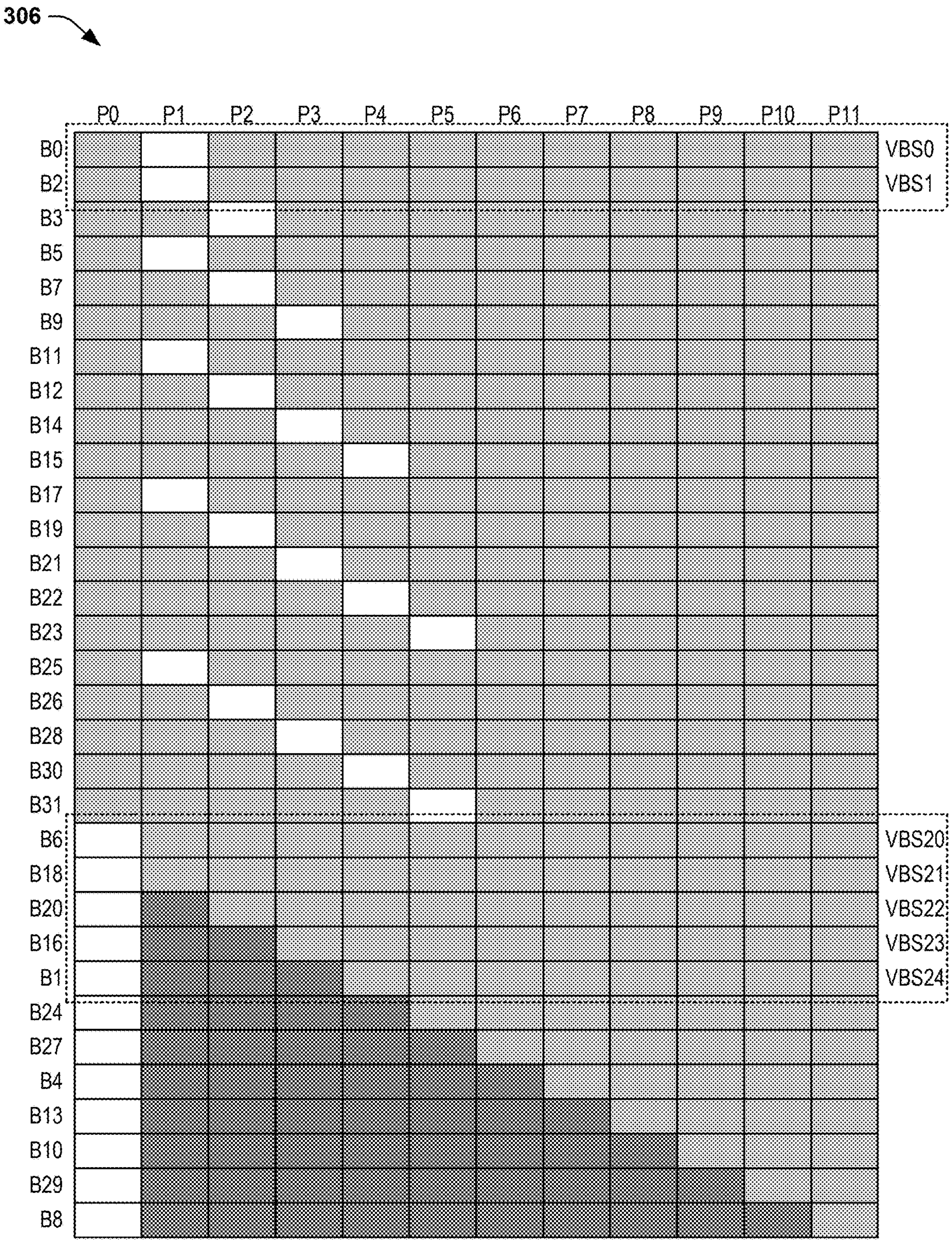
FIG. 3D illustrates another example diagram of generating virtual block stripes.

In an example diagram 304 in the example of FIG. 3C, the dissociation of the data blocks (B2, P1) and (B3, P2) from the respective banks B2 and B3 are demonstrated as being non-shaded to demonstrate that the respective data blocks (B2, P1) and (B3, P2) are not included the virtual data stripes that include the remaining operational data blocks of the respective banks B2 and B3. In addition, in the example of FIG. 3C, the block stripe control module 113 can determine that bank B1 has only eight operational data blocks. Therefore, the bank B1 can receive donor blocks from separate banks that include twelve operational data blocks. In the example of FIG. 3C, the block stripe control module 113 selects a first donor block from the bank B5, particularly block (B5, P1), a second donor block from the bank B7, particularly block (B7, P2), and a third donor block from the bank B9, particularly block (B9, P3). The block stripe control module 113 can thus logically map the donor blocks (B5, P1), (B7, P2), and (B9, P3) to the bank B1. The selected donor blocks from the banks B5, B7, and B9 are demonstrated as the blocks at planes P1, P2, and P3 respectively for ease of description, but could be any of the operational data blocks in the respective banks B5, B7, and B9. The data blocks that are donated from the banks B5, B7, and B9 to the bank B1 are demonstrated as having a darker shading. Therefore, the block stripe control module 113 can generate a virtual block stripe with the logical mapping of the data blocks (B5, P1), (B7, P2), and (B9, P3) and the data blocks (B1, P4-P11).

Additionally, because the donation of the data blocks (B5, P1), (B7, P2), and (B9, P3) provide that the quantity of the operational data blocks in the respective banks B5, B7, and B9 is now eleven based on the disassociation of the respective data blocks (B5, P1), (B7, P2), and (B9, P3) from the respective banks B5, B7, and B9, the block stripe control module 113 can generate virtual block stripes corresponding to the remaining operational data blocks (B5, P0) and blocks (B5, P2-P11) in bank B5, the remaining operational data blocks (B7, P0), (B7, P1) and blocks (B7, P3-P11) in bank B7, and the remaining operational data blocks (B9, P0-P2) and blocks (B9, P4-P11) in bank B9. Similar to as described above, the selection of the three data blocks for donation to the bank B1 are from three separate banks of fully operational data blocks to provide three additional virtual block stripes of quantity eleven, and thus equal to the minimum quantity of data blocks of the virtual block stripes.

The virtual block stripe algorithm can continue to operate until all banks are formed into virtual block stripes that each include at least eleven logically mapped operational data blocks. In an example diagram 306 in example of FIG. 3D, the virtual block stripe algorithm is demonstrated as concluded, with donated data blocks being unshaded and received donor data blocks being darker shaded. The memory device 130 is demonstrated in the example of FIG. 3D corresponds to only a portion of the entire memory device 130, in that the memory device 130 requires more banks than demonstrated in the example of FIG. 3D to complete the virtual block stripe algorithm. As described above, the block stripe control module 113 generates a virtual block stripe for each of the banks B0 through B31, but stores the logical mappings to provide the association of the data blocks from other banks in a given virtual block stripe. The example of FIG. 3D demonstrates a set of seven virtual block stripes, arbitrarily demonstrated for ease of description as VBS0, VBS1, VBS20, VBS21, VBS22, VBS23, and VBS24. The block stripe control module 113 can generate many more virtual block stripes, but the virtual block stripes VBS0, VBS1, VBS20, VBS21, VBS22, VBS23, and VBS24, and the logical mappings of the respective virtual block stripes, are demonstrated in FIG. 4 with reference to FIG. 3D.

Figure 4:
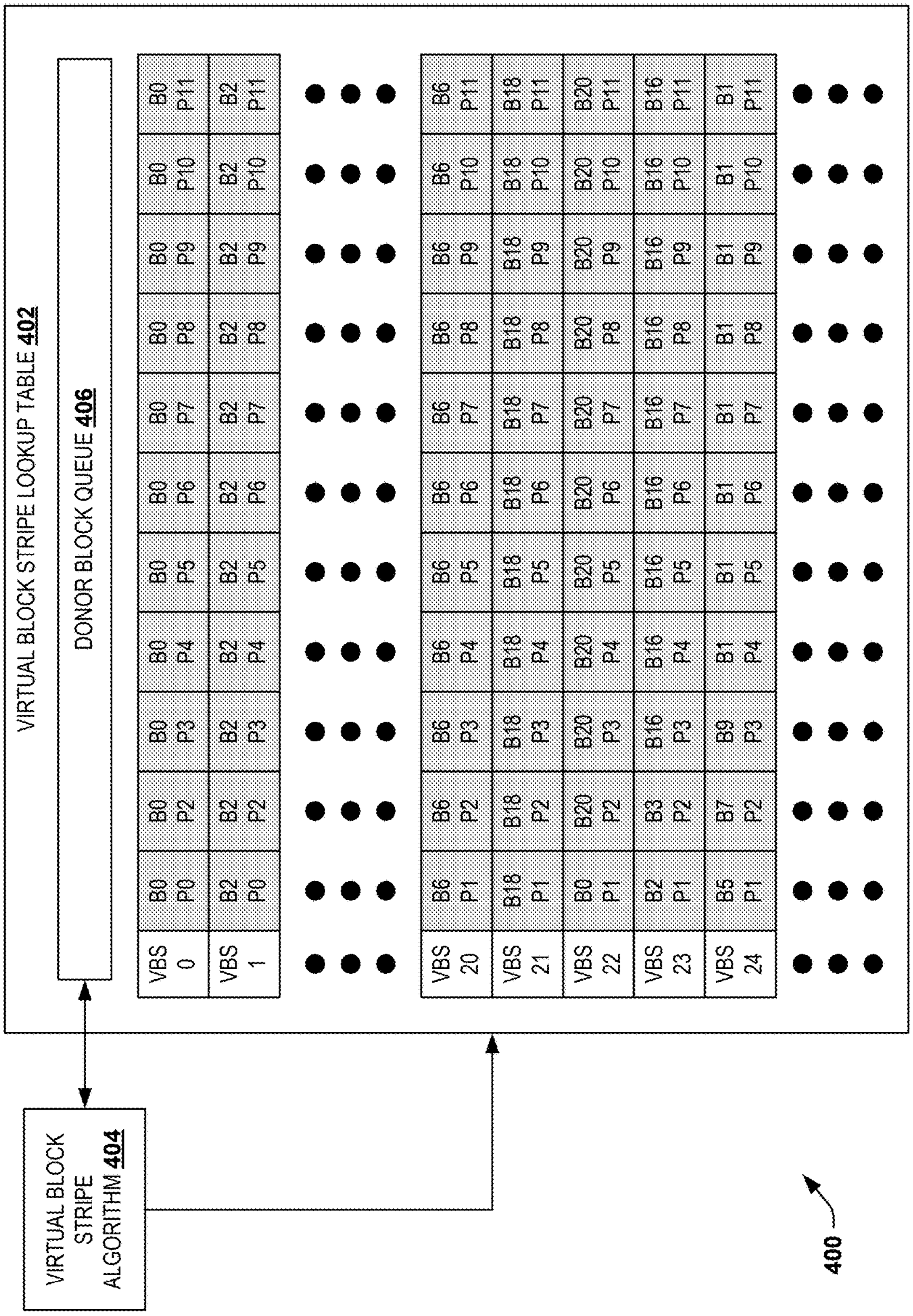
FIG. 4 illustrates an example diagram of updating a virtual block stripe lookup table.

FIG. 4 illustrates an example diagram 400 of updating a virtual block stripe lookup table 402. The virtual block stripe lookup table 402 includes the logical mappings of the data blocks in each of the virtual block stripes. Therefore, the memory sub-system controller 115 can access the virtual block stripe lookup table 402 when performing memory functions regarding the virtual block stripes and/or the data blocks included in the virtual block stripes.

The diagram 400 also includes the virtual block stripe algorithm 404 that is configured to generate the virtual block stripes via the block stripe control module 113, as described above. When the virtual block stripe algorithm 404 determines that a given bank includes greater than the minimum quantity of operational data blocks, the virtual block stripe algorithm 404 can determine which of the data block(s) of the respective bank can be donated and can queue the donor data block(s) in a donor block queue 406. 140. When the virtual block stripe algorithm 404 determines that a given bank includes fewer than the minimum quantity of operational data blocks, the virtual block stripe algorithm 404 can access the donor block queue 406 to select one or more donor blocks to receive for the respective bank from the donor block queue 406. In the example of FIG. 4, the donor block queue 406 is demonstrated as stored in the virtual block stripe lookup table 402, but could alternatively be stored in any other of a variety of locations in the memory device(s) 130 and/or The virtual block stripe algorithm 404 can additionally or alternatively operate in reverse. For example, when the virtual block stripe algorithm 404 determines that a given bank includes fewer than the minimum quantity of operational data blocks, the virtual block stripe algorithm 404 can queue a donor block request indicative of the need of a donor block in the donor block queue 406. When the virtual block stripe algorithm 404 determines that a given bank includes greater than the minimum quantity of operational data blocks, the virtual block stripe algorithm 404 can access the donor block queue 406 to select one or more donor block requests to fulfill with donor block(s) from the respective bank.

As described above, the virtual block stripe lookup table 402 includes the logical mappings/associations of the data blocks in each of the virtual block stripes. With reference to the example of FIG. 3D, the virtual block stripe lookup table 402 includes the virtual block stripes VBS0, VBS1, VBS20, VBS21, VBS22, VBS23, and VBS24 (among other virtual block stripes). The virtual block stripe lookup table also includes the logical mappings of all of the operational data blocks for each of the virtual block stripes VBS0, VBS1, VBS20, VBS21, VBS22, VBS23, and VBS24.

The virtual block stripe VBS0 includes the block (B0, P0) and blocks (B0, P2-P11), and the virtual block stripe VBS1 includes the block (B2, P0) and blocks (B2, P2-P11), as stored in the virtual block stripe lookup table 402. The virtual block stripe VBS20 includes the blocks (B6, P1-P11), and the virtual block stripe VBS21 includes the blocks (B18, P1-P11), as stored in the virtual block stripe lookup table 402. The virtual block stripe VBS22 includes the block (B0, P1) and the blocks (B20, P2-P11), and the virtual block stripe VBS23 includes the block (B2, P1), the block (B3, P2), and the blocks (B16, P3-P11), as stored in the virtual block stripe lookup table 402. The virtual block stripe VBS22 includes the block (B5, P1), the block (B7, P2), the block (B9, P3), and the blocks (B1, P4-P11), as stored in the virtual block stripe lookup table 402.

The virtual block stripe lookup table 402 thus enables the block stripe control module 113 to provide the logical associations of the data blocks in each of the virtual block stripes to enable the memory sub-system controller 115 to perform memory operation functions on the virtual block stripes. Because the generation of the virtual block stripes can utilize all of the operational data blocks in the memory device 130, and because the virtual block stripes can be approximately equal in quantity of data block (e.g., with a difference of quantity one), the virtual block stripes can provide for a more consistent and efficient memory control.

Figure 5:
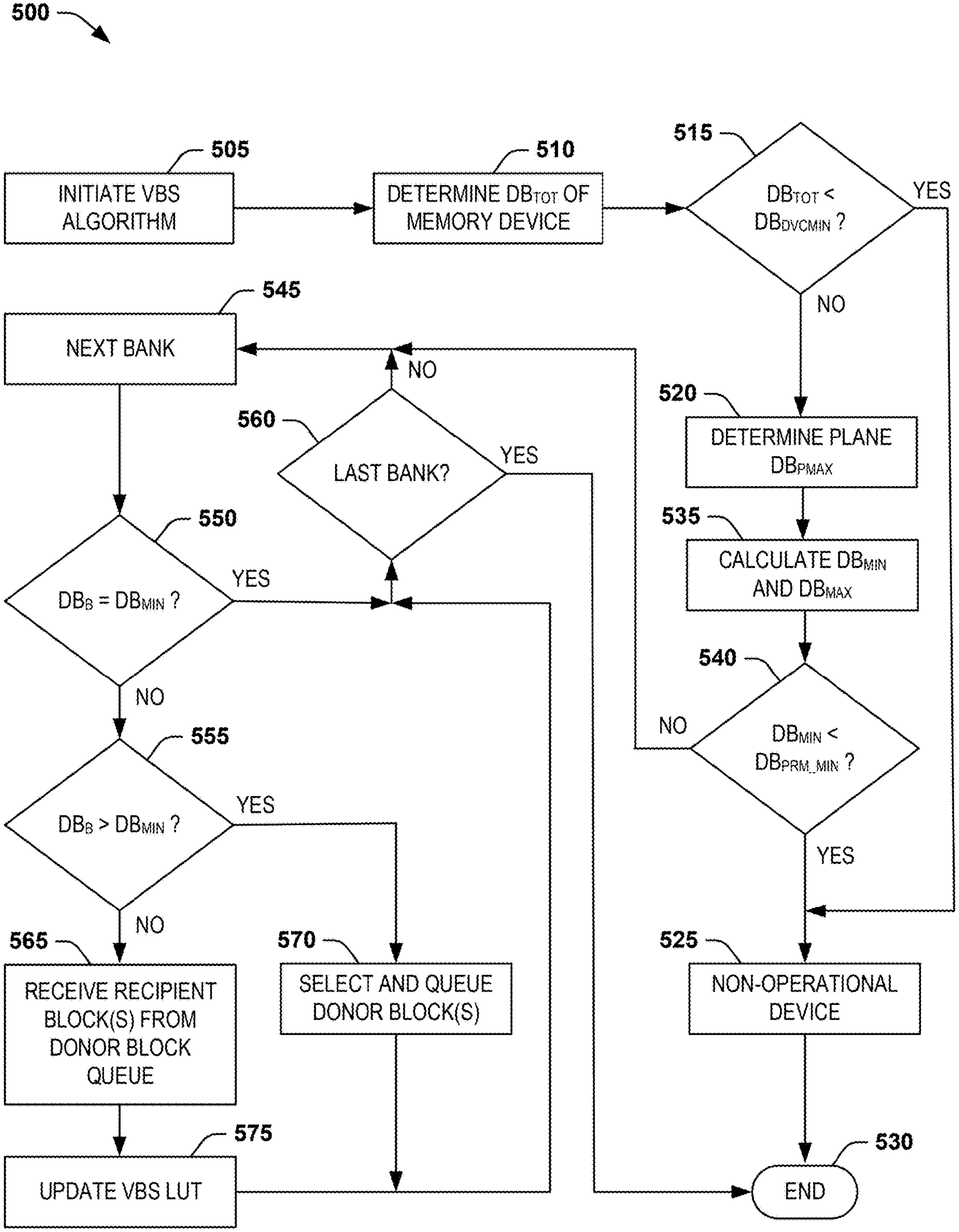
FIG. 5 illustrates an example flow diagram of a method for generating virtual block stripes.

FIG. 5 illustrates an example flow diagram of a method 500 for generating virtual block stripes for a memory device (e.g., the memory device 130). The method 500 can be implemented, for example, by a controller, such as the memory sub-system controller 115 (e.g., the block stripe control module 113) of the system 100 of FIG. 1A. The method 500 can thus correspond to the virtual block stripe algorithm 504 described herein. The method begins at method block 505, in which the controller initiates the virtual block stripe algorithm 404. The method then proceeds to method block 510.

At method block 510, the block stripe control module 113 determines the total quantity of operational data blocks, demonstrated as $DB_{TOT}$, of the memory device 130. For example, the total quantity of operational data blocks $DB_{TOT}$ can be determined during a testing process post-fabrication of the memory device 130. The method then proceeds to method block 515. At method block 515, a determination is made as to whether the total quantity of operational data blocks $DB_{TOT}$ is less than a minimum required total quantity of operational blocks of the memory device 130, demonstrated as $DB_{DVCMIN}$. As an example, the minimum required total quantity of operational blocks $DB_{DVCMIN}$ can correspond to an operational specification requirement of the memory device 130. If the determination at method block 515 is negative (e.g., NO), the method 500 proceeds to method block 520. If the determination at method block 515 is positive (e.g., YES), then the method 500 proceeds to method block 525. At the method block 525, the block stripe control module 113 determines that the memory device 130 is a non-operational memory device (e.g., a failed device), and the method proceeds to method block 530 at which the method 500 ends.

At method block 520, the block stripe control module 113 determines the maximum quantity of operational data blocks in a given one of the planes of the memory device 130, demonstrated as $DB_{PMAX}$. The method then proceeds to method block 535, at which the block stripe control module 113 calculates the minimum quantity of operational data blocks $DB_{MIN}$ and the maximum quantity of operational data blocks $DB_{MAX}$ of the virtual block stripes. As an example, the block stripe control module 113 can divide the total quantity of operational data blocks $DB_{TOT}$ by the maximum quantity of operational data blocks in a given one of the planes $DB_{PMAX}$. The quotient can be a decimal, such that the minimum quantity of operational data blocks $DB_{MIN}$ can be the quotient rounded down and the maximum quantity of operational data blocks $DB_{MAX}$ can be the quotient rounded up. The method 500 then proceeds to method block 540.

At method block 540, a determination is made as to whether the minimum quantity of operational data blocks $DB_{MIN}$ is less than a minimum required quantity of operational data blocks in each virtual block stripe for the memory device 130, demonstrated as $DB_{PRM\_MIN}$. As an example, the minimum required quantity of operational data blocks in each virtual block stripe $DB_{PRM\_MIN}$ can correspond to another operational specification requirement of the memory device 130. If the determination at method block 540 is negative (e.g., NO), the method 500 proceeds to method block 545. If the determination at method block 540 is positive (e.g., YES), then the method 500 proceeds to method block 525, at which the block stripe control module 113 determines that the memory device 130 is a non-operational memory device (e.g., a failed device), and the method 500 ends at method block 530.

At method block 545, the block stripe control module 113 selects a next bank for evaluation in the virtual block stripe algorithm 504. If the method 500 arrives at method block 545 from method block 540, the block stripe control module 113 selects a first one of the banks of the memory device 130. The method 500 then proceeds to method block 550. At method block 550, the block stripe control module 113 determines whether the quantity of operational data blocks $DB_B$ of the respective bank is equal to the minimum quantity of operational data blocks $DB_{MIN}$. If the determination at method block 550 is negative (e.g., NO), the method 500 proceeds to method block 555. If the determination at method block 540 is positive (e.g., YES), then the method 500 proceeds to method block 560. At the method block 560, the method 500 determines if the present bank is the last bank of the memory device 130 to be evaluated. If the determination at method block 560 is negative (e.g., NO), the method 500 proceeds back to method block 545 for selection of a next bank. If the determination at method block 560 is positive (e.g., YES), then the method 500 proceeds to method block 530 at which the method 500 ends.

At method block 555, arrived at if the quantity of operational data blocks $DB_B$ of the respective bank is not equal to the minimum quantity of operational data blocks $DB_{MIN}$, the block stripe control module 113 determines if the quantity of operational data blocks $DB_B$ of the respective bank is greater than the minimum quantity of operational data blocks $DB_{MIN}$. If the determination at method block 555 is negative (e.g., NO), the method 500 proceeds to method block 565. If the determination at method block 555 is positive (e.g., YES), then the method 500 proceeds to method block 570. At method block 570, the block stripe control module 113 can select and queue one or more donor blocks from the respective bank. For example, the block stripe control module 113 can provide the donor block(s) in the donor block queue 406 to indicate that the donor block(s) are available to be provided to a bank having fewer operational blocks than the minimum quantity of operational data blocks $DB_{MIN}$.

At method block 565, the block stripe control module 113 determines that the quantity of operational data blocks $DB_B$ of the respective bank is less than the minimum quantity of operational data blocks $DB_{MIN}$. Therefore, at method block 565, the block stripe control module 113 can access one or more donor block(s) from the donor block queue 406 and logically map the donor block(s) to the respective bank to generate a virtual block stripe. The method then proceeds to method block 575, at which the block stripe control module 113 updates the virtual block stripe lookup table 402 to include the logical mappings of the data blocks of the respective generated virtual block stripe. The method 500 then proceeds to method block 560, at which the block stripe control module 113 determines if the present bank is the last bank of the memory device 130 to be evaluated. The method 500 then proceeds either to method block 545 for selection of a next bank, or to method block 530 at which the method 500 ends.

Figure 6:
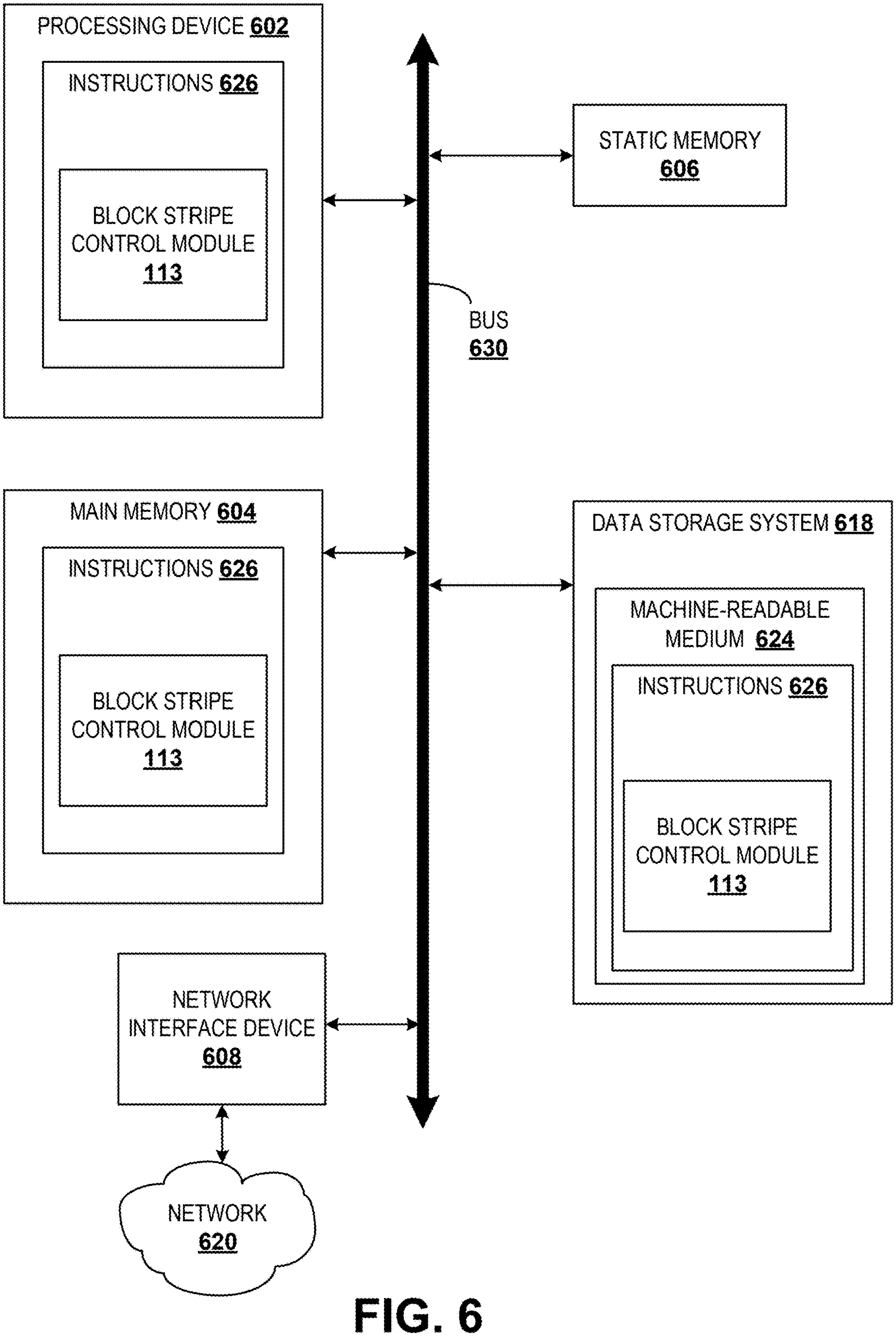
FIG. 6 illustrates an example of a computer system in which examples of the present description may operate.

FIG. 6 illustrates an example machine of a computer system 600 (a machine) within which a set of instructions, for causing the machine to perform any one or more of the methodologies discussed herein, can be executed. In some examples, the computer system 600 corresponds to a host system (e.g., the host system 120 of FIG. 1A) that includes, is coupled to, or utilizes a memory sub-system (e.g., the memory sub-system 110 of FIG. 1A) or is used to perform the operations of a controller (e.g., to execute an operating system to perform operations corresponding to the block stripe control module 113 of FIG. 1A). In other examples, the machine is connected (e.g., networked) to other machines in a LAN, an intranet, an extranet and/or the Internet. In various examples, the machine operates in the capacity of a server or a client machine in client-server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automotive application, a data center, a smart factory, or other industrial application. Further, while a single machine is illustrated, the term "machine" shall also be taken to include any collection of machines that individually or jointly execute a set (or multiple sets) of instructions to perform the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM) or other non-transitory computer-readable media) and a data storage system 618, which communicate with each other via a bus 630.

The processing device 602 represents one or more general-purpose processing devices such as a microprocessor, a central processing unit, etc. More particularly, the processing device 602 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 602 is implemented with a special-purpose processing devices such as an application specific integrated circuit (ASIC), a field programmable gate array (FPGA), a digital signal processor (DSP), network processor, etc. The processing device 602 is configured to execute instructions 626 for performing the operations discussed herein. In some examples, the computer system 600 includes a network interface device 608 to communicate over the network 620.

The data storage system 618 includes a machine-readable storage medium 624 (also known as a computer-readable medium) that store sets of instructions 626 or software for executing the methodologies and/or functions described herein. The machine-readable storage medium 624 is a non-transitory medium. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618 and/or main memory 604 can correspond to the memory sub-system 110 of FIG. 1A. Accordingly, the machine-readable storage medium 624, the data storage system 618 and/or the main memory 604 are examples of non-transitory computer-readable media.

In some examples, the instructions 626 include instructions to implement functionality corresponding to the block stripe control module 113 of FIG. 1A. As an example, the instructions can include implementing a virtual block stripe algorithm in which virtual block stripes are generated by donating data blocks from banks that have a greater quantity of data blocks than a minimum quantity to banks that have a fewer quantity of data blocks than the minimum quantity. While the machine-readable storage medium 624 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system or similar electronic computing device that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMS, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for generating a virtual block stripe in a memory device, the method comprising:

determining via a controller a total quantity of operational data blocks in the memory device relative to a quantity of non-operational data blocks in the memory device to determine a minimum quantity of data blocks in the virtual block stripe to be generated in the memory device via the controller, wherein determining the minimum quantity of data blocks in the virtual block stripe to be generated comprises:

determining a third quantity of data blocks of one of a plurality of planes of the memory device having a greatest quantity of operational data blocks;

dividing the total quantity of operational data blocks in the memory device by the greatest quantity of operational data blocks of the respective one of the planes of the memory device to determine a quotient; and rounding the quotient down to determine the minimum quantity of data blocks in the virtual block stripe to be generated;

determining via the controller that a first bank of data blocks in the memory device has a first quantity of operational data blocks that is greater than the minimum quantity of data blocks in the virtual block stripe to be generated;

determining via the controller that a second bank of data blocks in the memory device has a second quantity of operational data blocks that is less than the minimum quantity of data blocks in the virtual block stripe to be generated;

logically mapping one or more data blocks of the first bank to the second bank via the controller; and generating the virtual block stripe comprising the second quantity of operational data blocks of the second bank and the logically mapped one or more data blocks of the first bank via the controller.

2. The method of claim 1, further comprising updating a virtual block stripe lookup table in response to generating the virtual block stripe via the controller, the virtual block stripe lookup table providing logical mapping of each data block of each of a plurality of virtual block stripes.

3. The method of claim 1, wherein the virtual block stripe is a first virtual block stripe, the method comprising generating a second virtual block stripe comprising the first quantity of operational data blocks of the first bank less the one or more data blocks of the first bank that are logically mapped to the second bank via the controller.

4. The method of claim 1, further comprising:

selecting the one or more data blocks of the first bank to be one or more respective donor blocks that are added to a donor block queue via the controller; and selecting one or more recipient blocks from the donor block queue to be logically mapped to the second bank to generate the virtual block stripe via the controller.

5. The method of claim 1, further comprising:

determining if the total quantity of operational data blocks is less than a minimum operational block threshold; and indicating failure of the memory device in response to the total quantity of operational data blocks being less than the minimum operational block threshold.

6. The method of claim 1, further comprising:

determining if the minimum quantity of data blocks in the virtual block stripe to be generated is less than a minimum block stripe threshold; and indicating failure of the memory device in response to the minimum quantity of data blocks in the virtual block stripe to be generated being less than the minimum block stripe threshold.

7. The method of claim 1, further comprising:

determining via the controller that a third bank of data blocks in the memory device has a third quantity of operational data blocks that is equal to the minimum quantity of data blocks in the virtual block stripe to be generated;

leaving intact the third quantity of operational data blocks of the third bank; and selecting a next bank of data blocks in the memory device for comparing a respective quantity of operational data blocks relative to the minimum quantity of data blocks in the virtual block stripe to be generated.

8. The method of claim 7, wherein the virtual block stripe is a first virtual block stripe, the method comprising generating a second virtual block stripe corresponding to the third quantity of operational data blocks of the third bank via the controller.

9. A system for performing a media scan operation in a memory device, comprising:

the memory device; and a processing device coupled to the memory device, the processing device to perform operations comprising:

determining a total quantity of operational data blocks in the memory device relative to a quantity of non-operational data blocks in the memory device to determine a minimum quantity of data blocks in a virtual block stripe to be generated in the memory device, wherein determining the minimum quantity of data blocks in the virtual block stripe to be generated comprises:

determining a greatest quantity of operational data blocks between each of a plurality of planes of the memory device;

dividing a total quantity of operational data blocks in the memory device by the greatest quantity of operational data blocks between each of the planes of the memory device to determine a quotient; and rounding the quotient down to determine the minimum quantity of data blocks in the virtual block stripe to be generated;

determining that a first bank of data blocks in the memory device has a first quantity of operational data blocks that is greater than the minimum quantity of data blocks in the virtual block stripe to be generated;

determining that a second bank of data blocks in the memory device has a second quantity of operational data blocks that is less than the minimum quantity of data blocks in the virtual block stripe to be generated;

logically mapping one or more data blocks of the first bank to the second bank; and generating the virtual block stripe comprising the second quantity of operational data blocks of the second bank and the logically mapped one or more data blocks of the first bank.

10. The system of claim 9, further comprising updating a virtual block stripe lookup table in response to generating the virtual block stripe, the virtual block stripe lookup table providing logical mapping of each data block of each of a plurality of virtual block stripes.

11. The system of claim 9, wherein the virtual block stripe is a first virtual block stripe, the operations further comprising generating a second virtual block stripe comprising the first quantity of operational data blocks of the first bank less the one or more data blocks of the first bank that are logically mapped to the second bank.

12. The system of claim 9, further comprising:

selecting the one or more data blocks of the first bank to be one or more respective donor blocks that are added to a donor block queue; and selecting one or more recipient blocks from the donor block queue to be logically mapped to the second bank to generate the virtual block stripe.

13. A non-transitory computer-readable storage medium comprising instructions that, when executed by a processing device, cause the processing device to perform a method for generating a virtual block stripe of a memory device, the method comprising:

determining a total quantity of operational data blocks in the memory device relative to a quantity of non-operational data blocks in the memory device to determine a minimum quantity of data blocks in the virtual block stripe to be generated in the memory device, wherein determining the minimum quantity of data blocks in the virtual block stripe to be generated comprises:

determining a greatest quantity of operational data blocks between each of a plurality of planes of the memory device;

dividing a total quantity of operational data blocks in the memory device by the greatest quantity of operational data blocks between each of the planes of the memory device to determine a quotient; and rounding the quotient down to determine the minimum quantity of data blocks in the virtual block stripe to be generated;

determining that a first bank in the memory device has a first quantity of operational data blocks that is greater than the minimum quantity of data blocks in the virtual block stripe to be generated;

determining that a second bank in the memory device has a second quantity of operational data blocks that is less than the minimum quantity of data blocks in the virtual block stripe to be generated;

logically mapping one or more data blocks of the first bank to the second bank; and generating the virtual block stripe comprising the second quantity of operational data blocks of the second bank and the logically mapped one or more data blocks of the first bank.

14. The medium of claim 13, further comprising updating a virtual block stripe lookup table in response to generating the virtual block stripe, the virtual block stripe lookup table providing logical mapping of each data block of each of a plurality of virtual block stripes.

15. The medium of claim 13, wherein the virtual block stripe is a first virtual block stripe, the method comprising generating a second virtual block stripe comprising the first quantity of operational data blocks of the first bank less the one or more data blocks of the first bank that are logically mapped to the second bank.

16. The medium of claim 13, further comprising:

selecting the one or more data blocks of the first bank to be one or more respective donor blocks that are added to a donor block queue; and selecting one or more recipient blocks from the donor block queue to be logically mapped to the second bank to generate the virtual block stripe.

* * * * *